United States Patent [19]

Ross

[11] 4,177,885
[45] Dec. 11, 1979

[54] TORQUE CONVERTER AND LOCK-UP CLUTCH

[75] Inventor: Phillip J. Ross, Brownsburg, Ind.

[73] Assignee: General Motors Corporation, Detroit, Mich.

[21] Appl. No.: 951,090

[22] Filed: Oct. 13, 1978

[51] Int. Cl.² ............................................. F16D 47/06
[52] U.S. Cl. .................................. 192/3.3; 192/85 AA
[58] Field of Search ................... 192/3.29, 3.3, 85 AA, 192/86, 3.31

[56] References Cited

U.S. PATENT DOCUMENTS

| | | | |
|---|---|---|---|
| 2,613,503 | 10/1952 | Syrovy | 192/3.3 X |
| 3,497,043 | 2/1970 | Leonard | 192/3.3 X |
| 4,033,436 | 7/1977 | Hoetger et al. | 192/3.3 X |
| 4,108,290 | 8/1978 | Fisher | 192/3.3 X |

Primary Examiner—Benjamin Wyche
Attorney, Agent, or Firm—Donald F. Scherer

[57] ABSTRACT

A torque converter and multi-disc lock-up clutch has a pair of clutch discs splined to the input shell of the torque converter, a friction disc splined to the clutch piston intermediate the clutch discs and a friction pad secured to the clutch piston. The clutch piston is drivingly connected with the turbine of the torque converter. The clutch is controlled by fluid under pressure delivered to the torque converter such that during disengagement, the fluid passes between the clutch discs and the friction disc prior to entering the torque converter.

2 Claims, 1 Drawing Figure

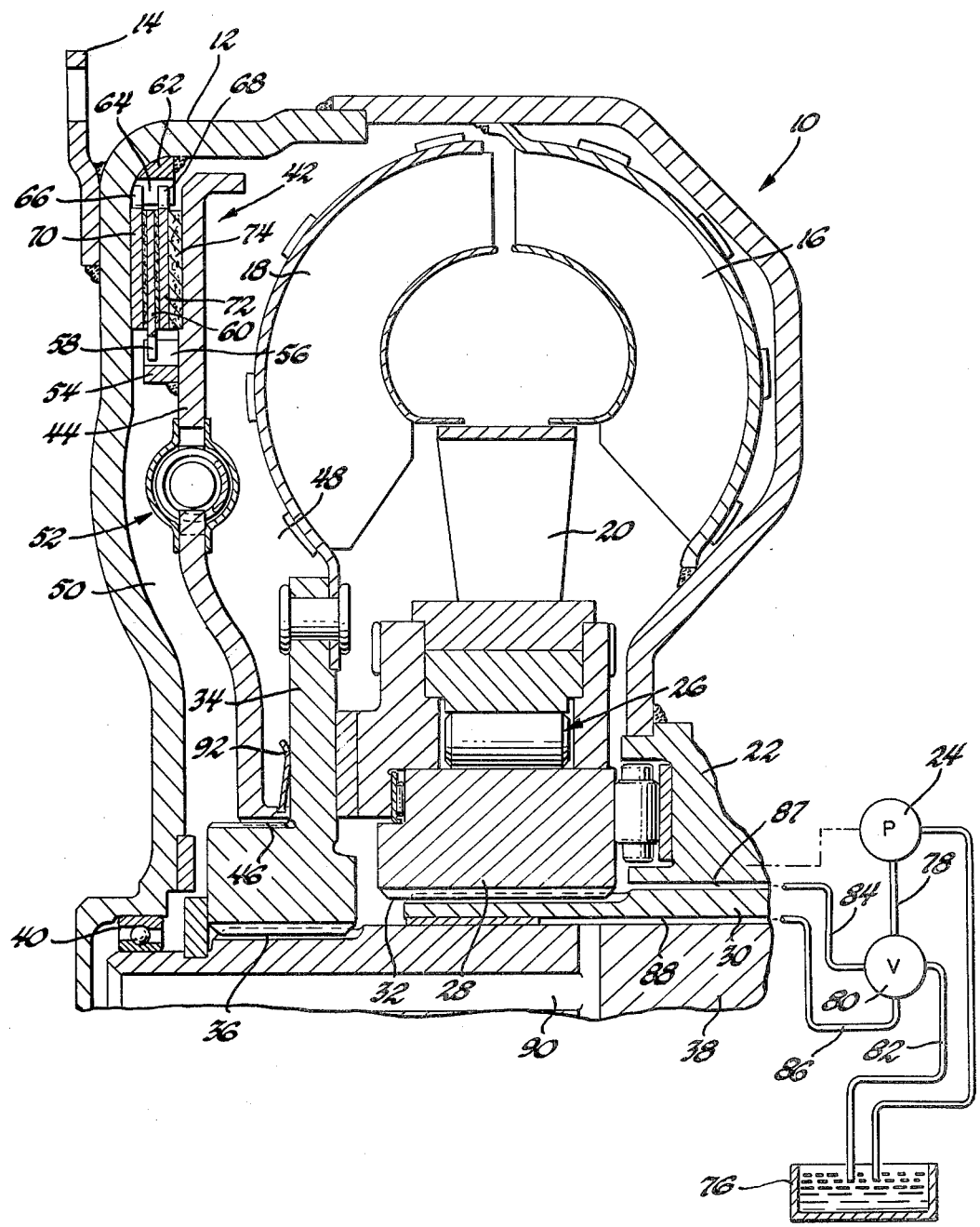

TORQUE CONVERTER AND LOCK-UP CLUTCH

This invention relates to lock-up clutches and more particularly to multi-disc lock-up clutches used in combination with a torque converter.

Prior art lock-up clutches utilizing reverse fluid flow through the torque converter, such as that shown in U.S. Pat. No. 3,252,352 to General et al, issued May 24, 1966, utilize a single plate clutch wherein the friction pad is secured to the clutch piston and/or the torque converter input shell.

The prior art devices have only two annular surfaces in contact during clutching engagement. The same is true of slipping type clutches used with torque converters such as that shown in U.S. Pat. No. 3,693,478 to Malloy, issued Sept. 26, 1972.

The present invention provides a plurality of clutching surfaces such that higher torque capacity for a given clutch apply pressure can be maintained. In drive systems where flow reversal through the torque converter is utilized to control the clutch engagement, the clutch apply pressure is significant since the torque converter structure must be capable of withstanding the clutch apply pressures.

It is therefore an object of this invention to provide an improved torque converter and lock-up clutch assembly having a multi-disc clutch pack wherein flow reversal through the torque converter controls clutch engagement and disengagement such that during clutch disengagement the fluid flow to the torque converter passes through the clutch pack.

This and other objects and advantages of the present invention will be more apparent from the following description and drawing which is a sectional elevational view of a torque converter and lock-up clutch.

Referring to the drawing, there is shown a torque converter 10 having an input shell 12 adapted to be secured to an engine through mounting lugs 14. The torque converter 10 further includes an impeller 16, a turbine 18 and a stator 20 each of which are conventional bladed elements arranged in the well-known torous flow relationship of a torque converter. The impeller 16 is secured to the input shell 12 and has a pump drive hub 22 which drives a positive displacement pump, shown schematically at 24. This pump 24 may be of any conventional design but is preferably an internal-/external type gear pump.

The stator 20 is connected through a conventional one-way device 26 which in turn has the inner race 28 thereof grounded to a stationary shaft 30 through a spline connection 32. The turbine 18 has an output hub 34 splined at 36 to a torque converter output shaft 38. The output shaft 38 is rotatably supported in the input shell 12 by a bearing 40.

A multi-disc clutch 42 is disposed in the space formed between the turbine 18 and the input shell 12 and includes a pressure plate or clutch apply piston 44 which is splined at 46 to the hub 34. The pressure plate 44 can move on spline 46 axially relative to turbine 18 and effectively separates the space between turbine 18 and input shell 12 into two chambers 48 and 50. One chamber 48 is a clutch apply or engagement chamber, and the other chamber 50 is a clutch disengagement chamber. A vibration damper 52 is incorporated into the clutch apply piston 44 to isolate engine torsional vibrations. An annular member 54 is secured to the clutch apply piston 44 and has formed thereon an outer spline surface 56 which engages spline teeth 58 formed on a friction disc 60 thus providing a drive relationship between the friction disc 60 and the clutch apply piston 44. The input shell 12 has secured thereto an annular member 62 on which annular member 62 is formed an inner spline surface 64 which meshes with splines 66 and 68 formed on clutch discs 70 and 72, respectively. Thus, a drive relationship is present between the clutch discs 70 and 72 and the input shell 12. An annular friction pad 74 is bonded to the clutch apply piston 44.

As can be seen in the drawing, the friction disc 60 is disposed intermediate the clutch discs 70 and 72 and the friction pad 74 is adjacent one surface of the clutch 72. As is common practice in multi-disc clutches, the clutch discs 70 and 72 are preferably steel while the friction disc 60 is preferably a steel disc coated with friction surfaces such as impregnated paper bonded thereto. The friction pad 74 is preferably the same material as the friction surface on friction disc 60.

The pump 24 draws fluid from a reservoir or transmission sump 76 and delivers the fluid under pressure via passage 78 to a control valve, shown schematically at 80. The control valve 80 may be of any conventional design and, if desired, may be similar to that shown in U.S. Pat. No. 3,693,478 issued to Malloy.

The valve 80 has an exhaust passage 82 connected to the reservoir 76 and two outlet passages 84 and 86. The valve 80 functions to selectively connect passage 78 with passage 84 and passage 86 with passage 82 or passage 78 with passage 86 and passage 84 with passage 82. Thus, it is possible to supply fluid under pressure to either passage 84 or 86 while the other passage 86 or 84 is connected to exhaust. The passage 84 is connected to communicate with the interior of the torque converter 10 through a passage 87 formed by the hub 22 and the shaft 30 while the passage 86 is in fluid communication with the disengagement chamber 50 through passage 88, formed between shafts 30 and 38, and passage 90, formed within the shaft 38.

When it is desired to disengage the clutch 42, fluid pressure is directed through passages 86, 88 and 90 to the disengagement chamber 50 from which it passes between the friction pad 74, clutch disc 72, friction disc 60 and clutch disc 70 and is then communicated to the torque converter 10 at the outer periphery between the impeller 16 and turbine 18. Fluid returns from the torque converter 10 through passages 87 and 84. During this condition, all input torque is transmitted through the torque converter and the clutch is in a disengaged or open running condition.

A low force spring 92 is secured to the clutch apply piston 44 and abuts the hub 34 thus supplying a light engagement force to the clutch 42 to assist in the initial engagement of the clutch. The spring force is sufficiently light so that very little pressure is necessary in the disengagement chamber 50 to initiate disengagement of the clutch.

When it is desired to engage the clutch 42, the valve 80 is operated to supply fluid pressure to passage 84 from which it enters the torque converter 10 and attempts to return to passage 86 through the clutch 42. However, the spring 92 and the resistance to fluid flow between the discs 60, 70 and 72 and pad 74, is sufficient to cause engagement of clutch 42 and a pressure differential is established between the clutch apply chamber 48 and the disengagement chamber 50 such that the clutch 42 will be in the applied or engaged condition.

In prior art lock-up clutches for heavy duty vehicles, it was found necessary to utilize an apply piston slidably disposed and sealed in a housing such that a multi-disc clutch pack could be used. The clutch 42 of the present invention permits the use of a multi-disc clutch pack in high torque requirement situations, but eliminates the need for a separate and sealed clutch apply chamber. This also permits the use of torque converter pressure as an apply force for a lock-up clutch when used in high torque systems such as those necessary in large trucks.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A torque converter and multiple disc lock-up clutch assembly wherein engagement and disengagement of the clutch is controlled by fluid flow reversal through the torque converter, said assembly comprising; an input shell; a first annular splined member secured to the inner surface of said input shell; a clutch plate piston drivingly connected to the turbine of said torque converter; a clutch apply chamber formed by said turbine and said clutch plate piston; a second annular splined member secured to said clutch plate piston and being substantially concentric with and having lesser outer diameter than the inner diameter of said first annular splined member; a pair of annular clutch discs having splined outer diameters meshing with said first annular splined member; an annular clutch friction disc having a splined inner diameter meshing with said second annular splined member and being disposed intermediate and in controllable friction drive relation with said pair of annular clutch discs; an annular friction surface secured to said clutch plate piston adjacent to and in controlled friction drive relation with one of said pair of annular clutch discs and axially spaced from said annular clutch friction disc by said one annular clutch disc; and means for supplying fluid to said clutch apply chamber so that the clutch plate piston can be pressurized to enforce a friction drive in the clutch assembly between said annular clutch discs and said annular clutch friction disc and said annular friction surface.

2. A torque converter and multiple disc lock-up clutch assembly wherein engagement and disengagement of the clutch is controlled by fluid flow reversal through the torque converter, said assembly comprising; an input shell; a first annular splined member secured to the inner surface of said input shell; a clutch plate piston axially spaced from, drivingly connected to, and axially movable relative to the turbine of said torque converter; a second annular splined member secured to said clutch plate piston and being substantially concentric with and having lesser outer diameter than the inner diameter of said first annular splined member; a plurality of annular clutch discs each having a splined outer diameter meshing with said first annular splined member; a plurality of annular clutch friction discs numbering one less than the number of annular clutch discs and each having a splined inner diameter meshing with said second annular splined member and being disposed alternately of and in controllable friction drive relation with said annular clutch discs; an annular friction surface secured to said clutch plate piston adjacent to and in controlled friction drive relation with one of said annular clutch discs and axially spaced from one of said annular clutch friction discs by said one annular clutch disc; and means for supplying fluid under pressure to the space between said clutch plate piston and said turbine so that the clutch plate piston is pressurized to enforce a friction drive in the clutch assembly between said annular clutch discs and said annular clutch friction discs and said annular friction surface.

* * * * *